United States Patent [19]

Cope

[11] Patent Number: 5,418,067

[45] Date of Patent: May 23, 1995

[54] COMPOSITION FOR COATING METAL, PLASTIC AND WOOD SUBSTRATES TO IMPART WOOD-LIKE APPEARANCE AND TEXTURE THERETO

[75] Inventor: Carroll W. Cope, Marion, Va.

[73] Assignee: Marley Mouldings Inc., Marion, Va.

[21] Appl. No.: 252,856

[22] Filed: Jun. 2, 1994

Related U.S. Application Data

[62] Division of Ser. No. 137,904, Oct. 14, 1993, Pat. No. 5,334,633.

[51] Int. Cl.6 .............................................. B32B 15/08
[52] U.S. Cl. ................................. 428/458; 427/388.5; 427/393; 427/393.5; 428/480; 428/481; 428/537.1
[58] Field of Search .................. 427/262, 388.1, 388.2, 427/393, 393.5, 388.5; 428/151, 458, 480, 481, 537.1

[56] References Cited

U.S. PATENT DOCUMENTS

| | | | |
|---|---|---|---|
| 4,546,133 | 10/1985 | Cope | 528/15 |
| 4,638,022 | 1/1987 | Cope | 524/15 |
| 4,722,854 | 2/1988 | Cope | 428/511 |
| 4,921,891 | 5/1990 | Cope | 524/15 |
| 4,980,402 | 12/1990 | Cope | 524/9 |
| 5,089,313 | 2/1992 | Cope | 428/151 |
| 5,198,481 | 3/1993 | Cope | 524/9 |
| 5,252,640 | 10/1993 | Cope | 524/15 |
| 5,334,632 | 8/1994 | Cope | 524/9 |
| 5,334,633 | 8/1994 | Cope | 524/15 |

*Primary Examiner*—Michael Lusignan
*Attorney, Agent, or Firm*—Willian Brinks Hofer; Hugh A. Abrams

[57] ABSTRACT

Compositions are provided for forming a coating on metal, plastic or wood substrate wherein the coating has the appearance and texture of wood, conceals joints on the surface of the substrate and is capable of accepting conventional wood stain.

7 Claims, No Drawings

COMPOSITION FOR COATING METAL, PLASTIC AND WOOD SUBSTRATES TO IMPART WOOD-LIKE APPEARANCE AND TEXTURE THERETO

This is a division of application Ser. No. 08/137,904, filed Oct. 14, 1993, now U.S. Pat. No. 5,334,633, patented Aug. 2, 1994.

The present invention is directed to a composition for coating metal, plastic or wood substrates to render them capable of receiving wood stains while also concealing joints and other imperfections in the substrate.

There are many applications in building construction in which the appearance of wood would be desired over metal, plastic or composite wood substrates. If wood itself is used as a substrate, a coating might conceal joints and imperfections in the wood. For plastic and metal substrates, such as exposed surfaces on doors, window frames and the like, it would be desirable to have the appearance and texture of wood. Moreover, to have a decorative effect, it would be desirable to be able to stain a wood-like surface to a desired color, such as walnut, rosewood, and the like, and then to cover it, if desired, with a protective coating, such as varnish, or other conventional clear coating.

It is therefore an object of the present invention to provide compositions which are useful for coating metal, plastic or wood substrates to impart the appearance of a solid piece of natural wood which is capable of receiving conventional wood stains.

These and other objects will be apparent from the following description and preferred embodiments.

The compositions of the present invention are basecoats for covering metal, plastic or wood substrates comprising a combination of resins, solvents, pigments, suspension agents, thickeners, wetting agents and absorption agents. The composition will be applied as a liquid basecoat onto a metal, plastic or wood substrate and the volatile solvents will be evaporated to form a uniform solid coating. If desired, ink compositions may be applied to the coating in wood grain patterns before staining. The ink compositions may be those disclosed in commonly assigned U.S. Pat. No. 4,546,133, the disclosure of which is incorporated herein by reference in its entirety.

Generally, the metal, plastic or wood substrate will first be coated with the liquid basecoat composition according to the present invention and then dried to remove the volatile solvents. The drying is preferably performed with heat in a conventional oven, but other evaporative methods may be utilized, particularly if a plastic surface is used as the substrate, since excessive heat should be avoided in such a case to avoid warpage or other deformation. Then an ink formulation in a grain pattern may be applied to simulate a wood grain using a conventional roller having a wood grain pattern. Apparatus for performing these functions are conventional and known in the art.

The basecoat formulation according to the present invention has the following components: alkyd resins, suspending agents, solvents, antimar agents, thickeners, melamine resins, wetting agents, pecan shell flour, white, yellow, black and red pigments and extenders, generally in the following proportions:

|  | % Volume |
| --- | --- |
| Alkyd resins | 3–4 |
| Maleic resins | 3–4 |
| Xylene | 14–18 |
| Other vol. solvents | 2–3 |
| Anti-marring agent | 2–4 |
| Tripentaerythritol | 40–45 |
| Melamine resin | 7–10 |
| Wetting agent | 0.01–0.1 |
| Deodorant | 0.2 |
| Thickener | 5–8 |
| Pecan shell flour | 0.1–0.3 |
| White pigment | 5–6. |
| Yellow pigment | 1.0 |
| Black pigment | trace |
| Red pigment | trace |
| Talc extender | 4–6 |
|  | 100% |

| Component | Amount | Function | Mfg. |
| --- | --- | --- | --- |
| Alkyd resin | 5.6 gal | Resin | Pinjoic Mod. |
| RJ-100 | 5.6 gal | Maleic resin | Monsanto |
| Xylene | 23.5 gal | Solvent |  |
| Collidisperse | .09 gal | Wetting agent | Troy |
| Chlorowax | 4.54 gal | Suspension agent | ChemControl |
| Tripentaerythritol | 64.25 gal | Absorption agent | Hercules |
| Superfine Melamine | 12.7 gal | Melamine resin | Melamine Corp. |
| Solvent 150 | 3.56 gal | Solvent | Chemtech |
| Deodorant | 0.3 gal |  | Guardsman |
| EHEC soln. | 9.6 gal | Thickener | Hercules |
| Nytal 300 | 7.0 gal | Extender | Vanderbilt |
| Pecan shell flour | 1.7 gal | Absorption agent |  |
| Titanium dioxide (white) | 8.0 gal | Pigment |  |
| Yellow pigment | 1.5 gal | Pigment |  |
| Black pigment | .05 gal | Pigment |  |
| Red pigment | .05 gal | Pigment |  |

In the above formulation, the resins are alkyd resins, melamine resins and maleic resins which include, but are not limited to, resins containing alkyd compounds formulated with a resin such as unsaturated polyesters and a diallyl phthalate cross-linking monomer, as well as melamineformaldehyde resins, polyester resins, extended polyesters, polystyrene, vinyl resins, polyamide resins, urea resins, acrylic resins, phenolic resins, coumarone-indene resins, urea-formaldehyde resins, epoxy resins, silicone resins, ionomer resins, acetal resins, polyethylene, polypropylene, hydrocarbon resins, rubber derivatives, polycarbonate resins, phenoxy resins, fluoroplastics, styrene-butadiene resins, polyurethane resins, furane resins, polysulfone resins, esters, gums, and the like. Natural resins may be used, which include shellac, rosin copal resins, damar resins, manila resins, and the like.

Absorption agents utilized are tripentaerythritol and pecan shell flour. The pecan shell flour is a key ingredient to achieving the wood-like texture and appearance according to the present invention and typically will be ground to the size of about 42 to 35 microns average diameter.

An antimarring agent, such as Chlorowax TM, will be utilized, as well as a thickener.

In addition, small amounts of wetting agents and a deodorant are utilized, such as Collidisperse TM (a wetting agent) and a conventional deodorant.

The solvents utilized include xylene and a commercial solvent known as Solvent No. 150 (made by Ashland or Chemtech). Other volatile solvents may be utilized, including toluene, MEK, acetone, cellulose acetate, methylisobutyl ketone, turpentine, pine oil, petroleum spirits, naphtha, mineral spirits, methyl and ethyl alcohol, toluol, benzol, xylol, ethyl acetate, amyl acetate, and the like.

Extenders such as talc (Nytal 300), clay, silica, whiting, gypsum, mica and barytes may be utilized in the amounts given above.

Finally, combinations of pigments are utilized to provide for a stainable wood appearance. The majority of the pigments will be a white hiding pigment, such as titanium dioxide. Other white hiding pigments include white lead, zinc oxide, lithopone, zinc sulfide, and basic lead sulfate. Another important pigment is a yellow pigment and may include such conventional agents as hansa yellows, ferrite yellows, cadmium lithopone, zinc chromate, ocher, or litharge. Then, if desired trace amounts of black and/or red pigments may be utilized, such as the red pigments red lead, iron oxide, cadmium reds and the black pigments such as carbon black, lamp black, graphite or magnetite black.

The amount of the solvents and volatile esters utilized will be in an amount sufficient to dissolve and/or suspend the various components to form a uniform suspension. It is desirable that the solvents comprise some polar solvents but primarily nonpolar solvents will be utilized, such as xylene, along with trace amounts of slightly polar solvents such as ketones. Higher molecular weight solvents may be utilized, such as petroleum distillates and esters, many of which are commercially available. It will be understood that various modifications in proportions and components may be utilized without departing from the scope of the present invention.

It will be appreciated that in addition to, or as substitutes for the above pigments, the basecoat may contain various typical inorganic or organic pigments useful for wood grain, such as those iron pigments ranging in color from yellow through red, reddish brown, and brown to black, similar to those found in natural wood.

After applying the basecoat to the metal, plastic or wood substrate, it is dried, for example, in a conventional oven to remove the volatile solvents thereby forming a hardened basecoat. The wood substrates may be any wood product having a wood surface including wood strips, with or without joints, wood sheet, including plywood and wood grained paper, or any other product derived from wood or wood pulp, sawdust, and the like. Plastic utilized as substrates may be any kind of conventional plastic, such as polyethylene, polyvinylacetate, polycarbonate, or any kind of durable plastic utilized as a construction material. Metal substrates according to the present invention in most cases, should preferably be primed to receive the basecoat according to the present invention. Exemplary primers for aluminum, steel, iron, and tin include conventional primers, such as polyester primers (PPG) or acrylic primers (Guardsman). Optionally, a tie-coat over-primer may be placed over the metal primer, such as a vinyl acrylic primer (Guardsman #447-0144). An ink formulation may then be applied to the dried basecoat with a roller having a wood grain pattern. The ink formulation may comprise resins, pigments, absorption pigments, tinting agents and wetting agents, as well as solvents. For example, those ink formulations disclosed in commonly assigned U.S. Pat. No. 4,546,133 and in copending commonly assigned Ser. No. 103,440, filed Sep. 30, 1987 in the name of Carroll Cope entitled PROCESS FOR COATING METAL AND PLASTIC IMPARTING WOOD-LIKE APPEARANCES, the disclosure of which is incorporated herein by reference, may be utilized.

The pigments in the ink formulation should, of course, impart a color to the basecoat which is different from the color of the dried basecoat, in order to provide contrast. Usually, such colorants should impart yellow or brown tones.

The basecoat, after application of the ink formulation, if desired, will be stained with a conventional wood stain which usually enhances the contrast between the basecoat and the ink.

After application of the graining formulation, air drying and staining, the final product may be coated with a conventional varnish or other clear preservative.

Having described the specific embodiments of the invention, modifications and variations will be apparent to those who are skilled in the art, which variations and modifications are intended to be within the scope of the present invention.

I claim:

1. A product comprising a wood, plastic or metal substrate and a coating, said coating formed by coating a suspension over said substrate, said suspension comprising:

|  | % Volume |
|---|---|
| Alkyd resins | 3-4 |
| Maleic resins | 3-4 |
| Xylene | 14-18 |
| Other vol. solvents | 2-3 |
| Anti-marring agent | 2-4 |
| Tripentaerythritol | 40-45 |
| Melamine resin | 7-10 |
| Wetting agent | 0.01-0.1 |
| Deodorant | 0.2 |
| Thickener | 5-8 |
| Pecan shell flour | 0.1-0.3 |
| White pigment | 5-6 |
| Yellow pigment | 1.0 |
| Black pigment | trace |
| Red pigment | trace |
| Talc extender | 4-6 |
|  | 100% | and drying said liquid coating to remove volatile solvents.

2. A product according to claim 1 wherein said suspension proportionally comprises by volume:
5.6 parts alkyd resin
5.6 parts maleic resins
23.5 parts xylene
0.09 parts wetting agent
4.54 parts suspension agent
64.25 parts tripentaerythritol
12.7 parts melamine resin
3.56 parts additional volatile solvent
0.3 parts deodorant
9.6 parts thickener
7.0 parts talc extender
1.7 parts pecan shell flour
8.0 parts titanium dioxide
1.5 parts yellow pigment
0.05 parts black pigment
0.05 parts red pigment.

3. A product according to claim 1 wherein said substrate comprises wood.

4. A product according to claim 1 wherein said substrate comprises metal.

5. A product according to claim 1 wherein said substrate comprises plastic.

6. A method for forming a coated product characterized by a surface having the texture and appearance of wood, comprising the steps of:

(a) applying a liquid suspension to a metal, plastic or wood substrate, said suspension comprising:

|  | % Volume |
| --- | --- |
| Alkyd resins | 3–4 parts |
| Maleic resins | 3–4 parts |
| Xylene | 14–18 parts |
| Other vol. solvents | 2–3 parts |
| Anti-marring agent | 2–4 parts |
| Tripentaerythritol | 40–45 parts |
| Melamine resin | 7–10 parts |
| Wetting agent | 0.01–0.1 parts |
| Deodorant | 0.2 parts |
| Thickener | 5–8 parts |
| Pecan shell flour | 0.1–0.3 parts |
| White pigment | 5–6 parts |
| Yellow pigment | 1.0 parts |
| Black pigment | trace |
| Red pigment | trace |

|  | % Volume |
| --- | --- |
| Talc extender | 4–6 parts |
|  | 100% |

(b) evaporating volatile solvents to form a solid coating.

7. A method according to claim 6 wherein said liquid proportionally comprises:
5.6 parts alkyd resin
5.6 parts maleic resins
23.5 parts xylene
0.09 parts wetting agent
4.54 parts suspension agent
64.25 parts tripentaerythritol
12.7 parts melamine resin
3.56 parts additional volatile solvent
0.3 parts deodorant
9.6 parts thickener
7.0 parts talc extender
1.7 parts pecan shell flour
8.0 parts titanium dioxide
1.5 parts yellow pigment
0.05 parts black pigment
0.05 parts red pigment.

* * * * *